United States Patent Office

2,904,425
Patented Sept. 15, 1959

2,904,425

METHOD OF MAKING LIME-CONTAINING FERTILIZERS AND ESPECIALLY SLAG LIME

Otto Kippe, Osnabruck, Germany, assignor to Paul Tobeler, doing business under the name of Trans-Oceanic, Los Angeles, Calif.

No Drawing. Application May 20, 1955
Serial No. 510,060

In Germany December 31, 1948

Public Law 619, August 23, 1954
Patent expires December 31, 1968

2 Claims. (Cl. 71—63)

This invention has to do generally with the production of finely ground plant fertilizers from coarse, moist, mineral containing materials, and more particularly relates to the processing of moist blast furnace slags with burned lime or dolomite to form an economical fertilizer containing minerals valuable to plant life.

While it is known that the mineral content of blast furnace slag, including lime, silica, iron and manganese oxides, is valuable to plant life, it is found that typical slags are not sufficiently basic for desirably effective use as fertilizers, and in addition such slags are normally so coarse as to require fine grinding prior to such use. However, fine grinding of representative slags is made impractically difficult by reason of their usually high moisture content resulting from standing in the open for long periods of time, so that the slags are not considered capable of economic processing for use as fertilizers.

It has now been discovered, in accordance with the present invention, that typical slags can be economically processed by admixing therewith burned lime or burned dolomite prior to or during grinding, either or both of these materials when added in sufficient quantities effecting the drying-out of the slag through moisture absorption and also desirably increasing the slag basicity. As a result, fine grinding may be carried out without difficulty, and the admixed resultant materials are made basic to a degree consistent with their effective use as plant fertilizers.

In accomplishing the specific steps in the slag treatment, recognition should be given to the fact that different slag samples contain varying amounts of moisture, which ordinarily will be between about 5 to 30 weight percent. Either burned lime, essentially CaO, or burned dolomite, essentially CaO.MgO, may be added to the moist slag in quantities sufficient to absorb most or all of the moisture content and to raise the basicity of the slag to the point where fine grinding may be effectively carried out and where the basicity is sufficiently high to enable the use of the ground material as an effective fertilizer. For such use, the lime and slag mix should have a calcium oxide content of not less than about 45% by weight. Accordingly, to 100 weight parts of slag having a moisture content falling within the range indicated, may be added between about 20 to 100 weight parts of burned lime, or between about 25 to 110 parts of burned dolomite. These materials may be added to the slag either before or during grinding thereof, thorough mixing being carried out before or during such grinding.

*Example*

To 100 pounds of blast furnace dump slag containing 42.5 pounds of calcium oxide and 11 pounds of water were added 45 pounds of burned lime or dolomite, comprising CaO.MgO. The resultant material was thoroughly mixed and subjected to fine grinding, which was performed without difficulty. The resultant dry slag-lime had the following approximate composition, found economically and practically useful as a plant fertilizer.

| | Percent |
|---|---|
| CaO | 55.18 |
| MgO | 5.16 |
| $SiO_2$ | 16.36 |
| $Al_2O_3$ | 2.33 |
| $Fe_2O_3$ | 1.56 |
| FeO | 1.98 |
| MnO | 1.18 |
| S | .51 |
| $SO_3$ | 1.88 |
| Loss of ignition | 13.79 |

In keeping with the purposes of the present invention, it is also possible to economically process less coarse slags by first subjecting them to partial drying, as by use of hot waste gases, and thereafter adding burned lime or dolomite to finally dry the slags prior to grinding. Since less moisture is contained by the slags after partial drying, decreased amounts of burned lime or dolomite need be admixed therewith, provided the basicity of the mix is not lowered too greatly.

In addition to treating blast furnace slags, similar moist raw materials may be processed by the addition of burned lime or burned dolomite to enable grinding thereof and to increase their lime content for effective use as fertilizers. For example, moist limestones, feldspars or phosphates may be so processed.

I claim:

1. The method of converting coarse, moist blast furnace slag from an openly exposed moist slag heap into usable plant fertilizer so as to obviate any calcination of the slag, said slag containing 5 to 30 percent moisture, that includes initially completely drying the moist slag by adding thereto only unslacked calcium oxide in the proportions 20 to 100 weight parts of calcium oxide per 100 weight parts of moist slag and thoroughly mixing the moist slag and calcium oxide until the entire mix becomes dry and the calcium oxide becomes slaked and so that the calcium oxide content of the mix is raised to at least 45% by weight, and then grinding said coarse dry mix to fine particle size for use as spreadable fertilizer.

2. The method of converting coarse, moist blast furnace slag from an openly exposed moist slag heap into usable plant fertilizer so as to obviate calcination of the slag, said slag containing 5 to 30 percent moisture, that includes initially completely drying the moist slag by adding thereto only unslaked burned dolomite comprising essentially CaO.MgO in the proportions 25 to 110 weight parts of burned dolomite per 100 weight parts of moist slag and thoroughly mixing the moist slag and dolomite until the entire mix becomes dry and the dolomite becomes slaked and so that the calcium oxide content of the mix is raised to at least 45% by weight, and then grinding said coarse dry mix to fine particle size for use as spreadable fertilizer.

References Cited in the file of this patent

UNITED STATES PATENTS

| 279,445 | Scheibler | June 12, 1883 |
| 714,330 | Reese | Nov. 25, 1902 |
| 1,163,130 | Connor | Dec. 7, 1915 |